(12) United States Patent
Budko et al.

(10) Patent No.: US 8,402,441 B2
(45) Date of Patent: Mar. 19, 2013

(54) MONITORING EXECUTION OF GUEST CODE IN A VIRTUAL MACHINE

(75) Inventors: Dmitriy Budko, Sunnyvale, CA (US); Xiaoxin Chen, Cupertino, CA (US); Oded Horovitz, Palo Alto, CA (US); Pratap Subrahmanyam, Saratoga, CA (US); Carl Waldspurger, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 1255 days.

(21) Appl. No.: 12/188,929

(22) Filed: Aug. 8, 2008

(65) Prior Publication Data

US 2009/0055693 A1     Feb. 26, 2009

Related U.S. Application Data

(60) Provisional application No. 60/954,733, filed on Aug. 8, 2007.

(51) Int. Cl.
G06F 9/44     (2006.01)
G06F 9/45     (2006.01)

(52) U.S. Cl. .................. 717/127; 717/128; 717/129
(58) Field of Classification Search ........... 717/125–133
See application file for complete search history.

(56) References Cited

U.S. PATENT DOCUMENTS

| | | | |
|---|---|---|---|
| 5,761,511 A | 6/1998 | Gibbons et al. | |
| 6,101,524 A | 8/2000 | Choi et al. | |
| 6,192,512 B1 * | 2/2001 | Chess | 717/127 |
| 6,298,476 B1 | 10/2001 | Misheski et al. | |
| 6,397,242 B1 | 5/2002 | Devine et al. | |
| 6,484,309 B2 | 11/2002 | Nowlin, Jr. et al. | |
| 6,550,052 B1 | 4/2003 | Cramer et al. | |
| 6,601,233 B1 | 7/2003 | Underwood | |
| 6,704,925 B1 | 3/2004 | Bugnion | |
| 6,785,886 B1 | 8/2004 | Lim et al. | |
| 6,941,545 B1 | 9/2005 | Reese et al. | |
| 6,954,923 B1 | 10/2005 | Yates, Jr. et al. | |
| 7,035,963 B2 * | 4/2006 | Neiger et al. | 711/6 |
| 7,043,716 B2 | 5/2006 | Zimmer et al. | |
| 7,117,481 B1 | 10/2006 | Agesen et al. | |
| 7,146,305 B2 * | 12/2006 | van der Made | 703/22 |
| 7,155,704 B2 | 12/2006 | Williams | |
| 7,222,221 B1 | 5/2007 | Agesen et al. | |
| 7,260,815 B1 * | 8/2007 | Chen et al. | 717/134 |
| 7,263,690 B1 * | 8/2007 | Shapiro | 717/128 |
| 7,272,815 B1 | 9/2007 | Eldridge et al. | |
| 7,421,681 B2 | 9/2008 | DeWitt, Jr. et al. | |
| 7,464,405 B2 | 12/2008 | Dawkins et al. | |
| 7,596,677 B1 * | 9/2009 | Koryakin et al. | 711/206 |
| 7,657,939 B2 * | 2/2010 | Strauss et al. | 726/23 |
| 7,676,294 B2 * | 3/2010 | Baier et al. | 700/108 |
| 7,685,638 B1 | 3/2010 | Buches | |
| 7,716,638 B2 | 5/2010 | Thornton | |
| 7,734,893 B2 * | 6/2010 | Hattori et al. | 711/209 |
| 7,748,037 B2 * | 6/2010 | Rajagopal et al. | 726/23 |
| 7,810,083 B2 | 10/2010 | Chinya et al. | |

(Continued)

OTHER PUBLICATIONS

Thomas et al, "Lowering overhead in sampling based execution moitoring and tracing", ACM LCTES, pp. 101-110, 2011.*

(Continued)

*Primary Examiner* — Anil Khatri

(57) ABSTRACT

A method is provided for monitoring registered code in a virtual machine of a virtualization system. The method includes instantiating a guest in the virtual machine of the virtualization system and monitoring execution of code registered for monitored execution in an execution context of the guest. The monitoring is performed by the virtualization system and is hidden from computations of the guest.

26 Claims, 6 Drawing Sheets

U.S. PATENT DOCUMENTS

| | | | |
|---|---|---|---|
| 7,818,808 B1 * | 10/2010 | Neiger et al. | 726/26 |
| 7,823,135 B2 | 10/2010 | Horning et al. | |
| 7,844,954 B2 * | 11/2010 | Venkitachalam et al. | 717/130 |
| 7,845,009 B2 | 11/2010 | Grobman | |
| 7,856,542 B1 * | 12/2010 | Koryakin et al. | 711/206 |
| 7,865,876 B2 | 1/2011 | Griffin et al. | |
| 7,904,909 B1 * | 3/2011 | Reiner et al. | 718/104 |
| 7,908,653 B2 | 3/2011 | Brickell et al. | |
| 7,953,980 B2 * | 5/2011 | Schluessler et al. | 713/176 |
| 7,954,160 B2 * | 5/2011 | Strauss et al. | 726/23 |
| 7,984,304 B1 * | 7/2011 | Waldspurger et al. | 713/187 |
| 7,984,420 B2 | 7/2011 | Eldridge et al. | |
| 8,024,798 B2 * | 9/2011 | Moritzen | 726/22 |
| 8,086,822 B2 | 12/2011 | Devine et al. | |
| 8,088,011 B2 * | 1/2012 | Russell et al. | 463/43 |
| 8,095,911 B2 | 1/2012 | Ronen et al. | |
| 8,099,718 B2 * | 1/2012 | Nagabhushan et al. | 717/130 |
| 8,112,747 B2 * | 2/2012 | Haeberle et al. | 717/172 |
| 8,117,600 B1 * | 2/2012 | Roeck et al. | 717/128 |
| 8,136,091 B2 * | 3/2012 | Erlingsson et al. | 717/121 |
| 8,171,255 B1 * | 5/2012 | Koryakin et al. | 711/207 |
| 8,239,836 B1 * | 8/2012 | Franz et al. | 717/127 |

OTHER PUBLICATIONS

Lo et al, "Worst case execution time analysis for parallel run time monitoring", ACM DAC, pp. 421-429, 2012.*

Talhi et al, "Execution monitoring enforcement for limited memory systems", ACM, pp. 1-12, 2006.*

Srinivasa et al, "Process out grafting: an efficient out of VM approach for fine grained execution monitoring", ACM CCS, pp. 363-374, 2011.*

U.S. Appl. No. 11/584,178, filed Oct. 20, 2006, entitled "Isolating Data Within a Computer System Using Private Shadow Mappings", by Chen, et al.

U.S. Appl. No. 12/051,516, filed Mar. 19, 2008, entitled "Impeding Progress of Malicious Guest Software", by Budko et al.

U.S. Appl. No. 10/791,602, filed Mar. 2, 2004, entitled "Dynamic Verification of Validity of Executable Code", by Waldspurger et al.

U.S. Appl. No. 12/188,973, filed Aug. 8, 2008, entitled "Forcing Registered Code Into an Execution Context of Guest Software", by Budko et al.

Notice of Allowance for U.S. Appl. No. 12/188,973, mailed Jun. 27, 2002.

Hazelwood, "Process level virtualization for runtime adaption of embedded software", ACM DAC, pp. 895-900, 2011.

Ku et al., "Method for distribution, execution and management of the customized application based on software virtualization", ACM, pp. 493-496, 2010.

Myint et al., "Availability improvement in virtualized multiple servers with software rejuvenation and virtualization", IEEE, pp. 156-162, 2010.

Du et al., "Performance profiling of virtual machines", ACM VEE, pp. 3-14, 2011.

Non-Final Rejection for U.S. Appl. No. 12/188,973, mailed Jan. 13, 2012.

* cited by examiner

MONITORING EXECUTION OF GUEST CODE IN A VIRTUAL MACHINE

CROSS-REFERENCE TO RELATED APPLICATION(S)

This application claims benefit under 35 U.S.C. §119(e) of U.S. Provisional Application No. 60/954,733, filed Aug. 8, 2007.

In addition, this application is related to the following commonly-owned, co-pending US Patent Applications: (1) 12/051,516, filed Mar. 19, 2008, entitled "IMPEDING PROGRESS OF MALICIOUS GUEST SOFTWARE," and naming as inventors Budko, Chen, Horovitz and Waldspurger; (2) 12/188,973, filed Aug. 8, 2008, entitled "FORCING REGISTERED CODE INTO AN EXECUTION CONTEXT OF GUEST SOFTWARE," and naming as inventors Budko, Chen, Horovitz, Subrahmanyam and Waldspurger; (3) 10/791,602, filed Mar. 2, 2004, entitled "DYNAMIC VERIFICATION OF VALIDITY OF EXECUTABLE CODE" and naming as inventors, Waldspurger, Agesen, Chen, Zedlewski, and Garfinkel; and (4) 11/584,178, filed Oct. 20, 2006, entitled "ISOLATING DATA WITHIN A COMPUTER SYSTEM USING PRIVATE SHADOW MAPPINGS" and naming as inventors, Chen, Waldspurger, and Subrahmanyam.

BACKGROUND

The vulnerability of computer systems, configurations, software, information codings and protocols to unauthorized access or use is problematic. In general, these vulnerabilities can range from minor annoyances to national security risks. Automated tools facilitate probing of systems and discovering vulnerable systems and configurations. Once vulnerabilities are identified, exploits (often embodied as computer viruses, worms, trojans, spyware, rootkits and/or other malicious forms of code) can be globally disseminated and rapidly employed.

In recognition of threats posed by such vulnerabilities, methods have been developed to identify malicious software in use, in media or in transit. Indeed, persons of skill in the art will appreciate a broad range of existing methods including signature- and/or behavior-based detection methods employed in commercially-available anti-virus and/or intrusion detection/prevention systems.

Unfortunately, once running, malicious software may attempt to hide itself, disable existing security checks or otherwise evade detection. In some cases, the very tools and facilities that might be relied upon to detect, isolate, terminate or mitigate malicious code are themselves subject to compromise. For example, if an operating system (or an antivirus/intrusion detection facility) is itself compromised, it may be unrealistic to expect the compromised system/facility to reliably interdict malicious code even if an exploit is successfully identified. Indeed, a common strategy of many exploits (after gaining privileged access) is to disable, interfere with, or otherwise subvert the very systems that are designed to protect against them.

SUMMARY

Embodiments of the present invention include methods, systems, apparati, computer program products and other tangible realizations of techniques for monitoring execution of registered code within a virtual machine, wherein the monitoring is performed from behind a virtualization barrier without reliance on functionality of a guest operating system executing within the virtual machine. In particular, one embodiment of the present invention is a method comprising (a) instantiating a guest in a virtual machine of a virtualization system; and (b) monitoring execution of code registered for monitored execution in an execution context of the guest, wherein the monitoring is performed by the virtualization system and is hidden from computations of the guest.

BRIEF DESCRIPTION OF THE DRAWINGS

The use of the same reference symbols in different drawings indicates similar or identical items.

DESCRIPTION

Figure 1:
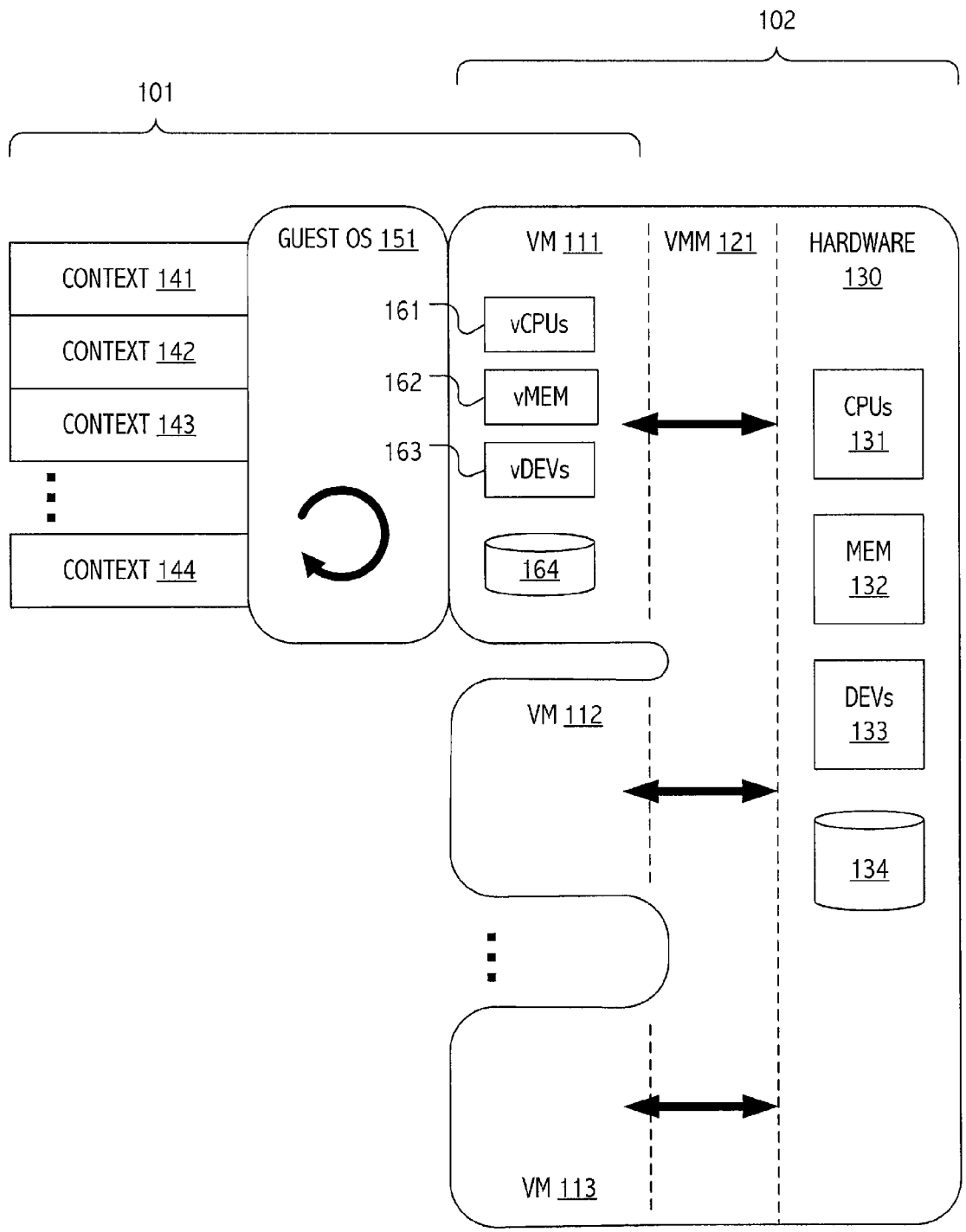
FIG. 1 depicts a virtualization system in which one or more embodiments of the present invention may be employed.

Various programs and protective constructs, such as anti-virus scanners, host firewalls, intrusion-detection software, registry monitors, etc. can benefit from system-level support for assuring that certain specified operations are executed as intended. When the possibility exists that malicious software operates, or could operate, within a virtual machine, it can be desirable to verify or guarantee such execution without relying on cooperation or support from the guest operating system or other software running within the virtual machine, since the guest software may have already been compromised.

Accordingly, in one or more embodiments in accordance with the present invention, methods, systems, apparati, computer program products and/or other tangible realizations of techniques are employed to monitor code registered for execution within a virtual machine. Monitoring is performed from behind a virtualization barrier without reliance on functionality of a guest operating system executing within the virtual machine. For example, in some embodiments, the virtualization layer itself monitors whether or not registered guest code is actually executed as expected. If it detects that the registered code has not been executed as expected, it can respond appropriately based on a specified security policy. Depending on the particular security policy implemented, appropriate responses can include generation of notifications or alerts, escalation of a security posture and/or actions designed to forcibly execute the registered code.

For the most part, embodiments of the present invention operate at (or from) a virtualization layer (e.g., within a virtual machine monitor or hypervisor) and do not require cooperation or support from a guest operating system running within a virtual machine. This independence can be useful when, as is often the case, an operating system is (or may be) compromised by the malicious software itself or via a complementary attack vector. That said, persons of ordinary skill in the art will recognize that modern operating system vendors face increasing pressure to include virtualization features or capabilities in their product offerings, and as a result, product offerings styled as operating systems may increasingly incorporate virtualization system concepts. Accordingly, it is important to recognize that a virtualization barrier or boundary, i.e., a barrier or boundary between (i) software that manages, exposes and/or aggregates underlying hardware resources for presentation as a virtual machine and (ii) software that operates within such a virtual machine, can exist at the interface between separately supplied software components or within software marketed, aggregated and/or supplied as a single product. Indeed, embodiments that provide virtualization support in a software product marketed, aggregated and/or supplied as an "operating system" are envisioned and may fall within the scope of certain of the appended claims.

Some embodiments of the present invention allow registration of guest code that is intended to execute in response to certain trigger events. One simple example of an execution trigger is an amount of elapsed time, specified in units such as milliseconds, processor cycles, or timer ticks. However, triggers may also be specified in units of some other event, such as a count of received network packets, or a count of cache misses. Other types of triggers include attempts to execute some particular guest code address, particular guest instruction type (such as a syscall or memory management operations), or even attempted accesses to particular guest memory addresses.

Although some embodiments of the present invention are described in an overall context that includes anti-virus, anti-spyware, intrusion detection/protection or other anti-malware systems or techniques, it is important to recognize that embodiments of the present invention do not require anti-malware systems or techniques. Indeed, anti-malware systems are but one example of code that may be monitored to assure execution within a virtual machine. Based on the description herein, persons of ordinary skill in the art will appreciate applications to other types of monitored code in addition to anti-malware systems. Furthermore, some embodiments of the present invention are implemented in software systems or computer program products that do not themselves provide malware detection or protection, but in which cooperative systems or products are used. Accordingly, in some embodiments a generalized facility for registration of code to be monitored can be provided, e.g. via an application programming interface (API). Finally, even in those embodiments in which anti-malware systems or techniques may be implemented, we do not presuppose any particular anti-malware system or technique.

Several illustrative embodiments of the present invention are described herein. In general, the described embodiments may be employed individually or in combination in a given implementation. The embodiments will be understood both in terms of general strategies (such as selective alteration of virtual machine operation and/or modifications to code and/or control flows to transparently interpose on the execution of particular code, memory accesses and/or I/O operations) and based on specific implementations.

For example, in some embodiments, virtual machine operations executed by monitored code may be selectively altered to supply a hidden fault, trap or interrupt under circumstances in which faithful emulation of a particular physical machine would not otherwise dictate. Such a hidden fault, trap or interrupt can then be intercepted by the virtualization layer to record that corresponding code was actually executed. In some embodiments, page table entries are selectively modified to generate such faults upon execution of code that appears within a monitored memory page. In some embodiments, the instruction sequences actually executed for a particular execution context are altered. Typically, such alterations can be made in the virtualization system (e.g., using a binary translation facility) to effect the desired changes to code semantics or control flows.

For concreteness, embodiments based on facilities, terminology and exploits typical of certain processor architectures, operating systems, virtualization systems and network protocols and/or services are described. For example, conventional processor and operating system features, mechanisms and constructs typical of microprocessors and software available from Intel Corporation and Microsoft Corporation provide a useful descriptive context for our techniques. That said, embodiments of the present invention are general to a wide variety of processor and system architectures (including both single- and multi-processor architectures based on any of a variety of instruction set architectures), to numerous operating system implementations as well as to computations that need not include, or be coordinated by, a conventional operating system.

Accordingly, in view of the foregoing and without limitation on the range of underlying processor, hardware or system architectures; operating systems; or virtualization techniques that may be employed in embodiments of the present invention, based on these embodiments, and on the claims that follow, persons of ordinary skill in the art will appreciate a broad range of suitable implementations and embodiments.

Virtualization Systems, Generally

FIG. 1 depicts a virtualization system in which techniques in accordance with one or more embodiments of the present invention may be employed. In particular, FIG. 1 is meant to illustrate a class of virtualization system embodiments in which underlying hardware resources 130 are exposed to guest computations as one or more isolated, and apparently independent, virtual machines (e.g., VM 111, VM 112 . . . VM 113). In the illustrated system, guest system 151 (e.g., an instance of a conventional Microsoft® Windows or Linux® operating system) executes in coordination with VM 111, providing application software and operating system services with virtual computer 101 on (or in) which to execute. As is typical of modern operating system design, applications (and some services) usually run in their own memory address spaces and can include one or more execution contexts (e.g., contexts 141, 142, 143 . . . 144) each having an associated instruction pointer and other state. Typically, an execution context, which may be referred to as a "process," "thread" or "task" depending on conventions of the particular operating system or execution environment, includes at least state of processor registers (and perhaps uncommitted memory state) together with a virtual address space (consistent with page table mappings).

As on a conventional hardware computer platform, guest operating system 151 coordinates execution sequences of instructions on one or more processors (or CPUs), helps to maintain memory management and/or mapping information (e.g., virtual-to-physical page mappings) and manages devices of an underlying computational machine. Together, the operating system and underlying computational machine (e.g., guest operating system 151 and VM 111 of virtual computer 101 in the illustrated configuration) manage context switches amongst various execution contexts based on priority, data or instruction memory access stalls, input/output events, explicit code directives, etc. Numerous techniques and designs (both hardware and software) for scheduling and performing context switches in multitasking/multithreaded systems are known and will be understood by persons of ordinary skill in the art. However, in each case, the identity of at least a current execution context is part of the observable state of the computational machine (or in the illustration of FIG. 1, of VM 111).

From the perspective of operating system 151 and the individual execution contexts thereof, exposed VM 111 appears to be and, indeed, behaves like a conventional hardware computer platform, executing instruction sequences and presenting an apparent processor and memory state. Indeed, in some embodiments of virtualization system 102, the interface presented by VM 111 may be nearly indistinguishable from a conventional hardware computer platform. However, unlike a conventional hardware computer platform, virtualization system 102 itself manages underlying hardware resources (e.g., without limitation, CPUs 131, memory 132, devices 133 and storage 134) and generally exposes virtual resources (e.g., virtual processor(s) 161, vMEM 162, virtual devices 163 and virtual storage 164) rather than the underlying resources themselves to guest computations such as guest operating system 151 and any applications/services executing therewith. In general, the characteristics and configurations of an exposed virtual machine need not match those of underlying hardware resources, although in many implementations, a correspondence between instruction set architectures of exposed virtual processors and underlying hardware CPUs may be desirable.

Although particular virtualization strategies/designs are described herein, virtualization system 102 is representative of a wide variety of designs and implementations in which underlying hardware resources are presented to software (typically to operating system software and/or applications) as virtualized instances of computational systems that may or may not precisely correspond to the underlying physical hardware.

Virtualization systems are well known in the art and include commercial implementations, such as VMware ESX™, VMware® Server and VMware® Workstation, available from VMware, Inc., Palo Alto, Calif.; Microsoft® Virtual Server 2005; operating systems with virtualization support, such as Linux KVM or user-mode Linux (UML); and open-source implementations such as those available from XenSource, Inc. Accordingly, persons of ordinary skill in the art will appreciate the described embodiments for selectively impeding progress of a targeted computation in the context of a substantial existing body of virtual machine technology.

Typically, virtual resources of an exposed virtual machine are presented to a guest computation using mapping and/or emulation techniques. In general, some interface is provided between the guest software and the various hardware components and devices in the underlying hardware platform. This interface may include one or more software components and/or layers, possibly including one or more software components known in the field of virtual machine technology as "virtual machine monitors" (VMMs), "hypervisors," or virtualization "kernels." For purposes of illustration only, and without limitation, VMM layer 121 is illustrated in which the operative mappings and/or emulations will typically be performed. In the description that follows, certain enhancements or alterations are described that may be made to VMM and/or VM operation to monitor execution of code in an execution context of guest operating system 151. These and other embodiments will be understood with reference to the description that follows.

Virtualization System Support for Monitoring Registered Code

Figure 2:
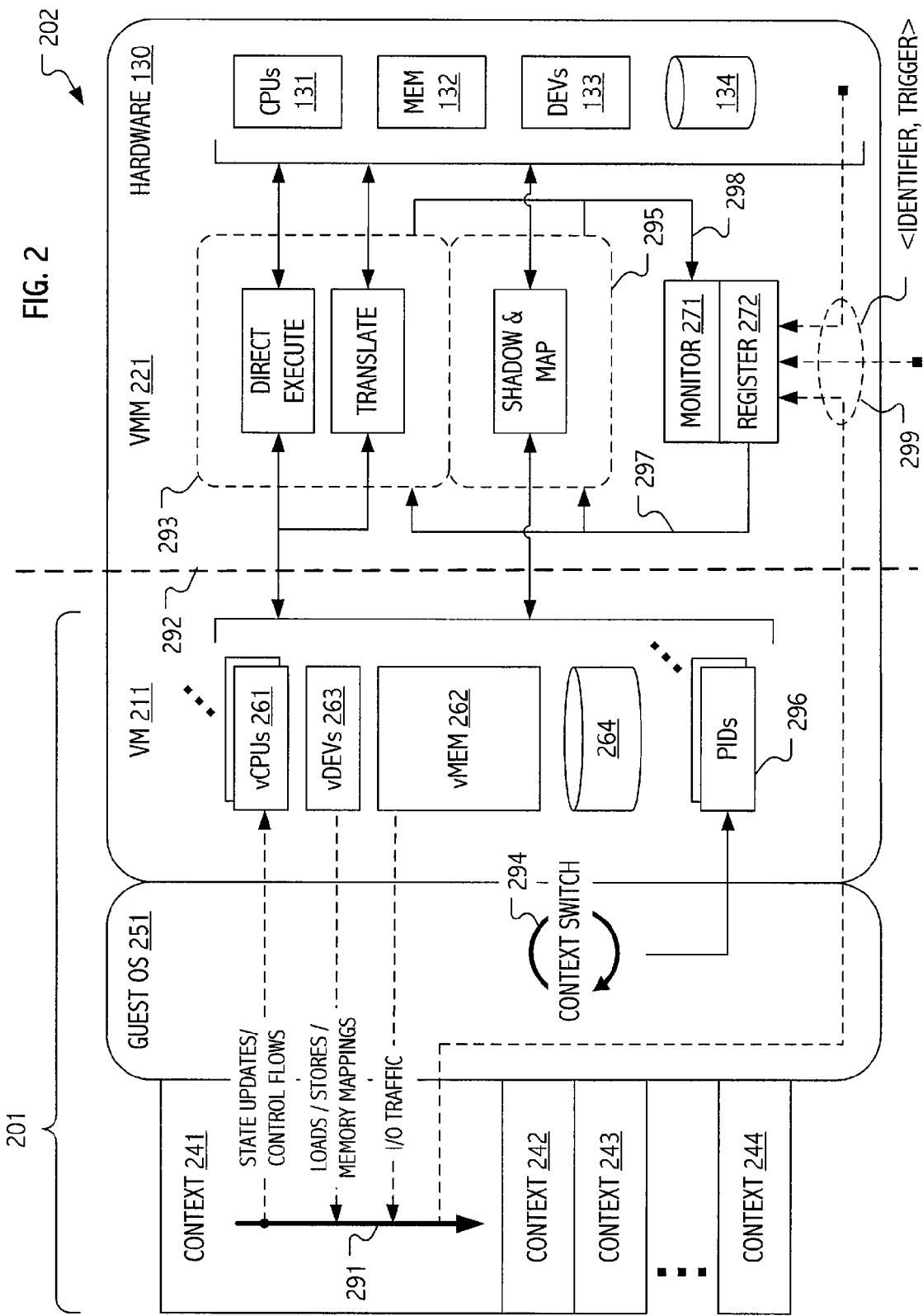
FIG. 2 is a functional block diagram illustrating hardware and software components of a virtualization system that supports operation of a guest operating system (and execution contexts thereof) and in which monitoring of registered code registered in accordance with one or more embodiments of the present invention is illustrated.

FIG. 2 is a functional block diagram illustrating hardware and software components of a virtualization system that supports operation of a guest operating system (and execution contexts thereof) and in which monitoring execution of registered code is provided using one or more techniques of the present invention. As previously explained with reference to FIG. 1, an operating system instance, e.g., guest operating system 251, coordinates execution of various execution contexts (corresponding generally to processes, threads and/or tasks) on an exposed virtual machine, e.g., VM 211. Thus, virtual computer 201 operates (at least from the perspective of operating system 251 and execution contexts 241, 241, 243 . . . 244) in a manner largely analogous to a conventional hardware computer.

Each virtual CPU (vCPU) typically has its own "active" context and, at any given time, an execution context (e.g., current context 241) will be current and state of at least one vCPU 261 corresponds thereto. In particular, register states, instruction pointer state, memory address translation data structures etc. presented by VM 211 are those appropriate to the current state of current context 241. Therefore, instruction sequences (including sequences of user code and system calls appropriate to current context 241) are executed on VM 211 and ordinarily result in progress of a computation associated with current context 241. In particular, individual instructions of instruction sequence 291 are ordinarily executed and result in updates to register state of exposed vCPU 261. Control flow instructions affect call/return stacks and load & store instructions affect buffer and vMEM 262 states, as well as memory address translation data structures (including page table states, translation lookaside buffer (TLB) states, etc) that reside in memory exposed as vMEM 262. Input/output operations affect the state of exposed vDEVs 264 and typically transfer data through buffers in memory exposed as vMEM 262.

As is typical in the art, switches between execution contexts are managed or initiated by operating system 251 based on desired multitasking and scheduling behavior and based on events such as execution and/or memory access stalls and interrupts or faults supplied by VM 211. Context switch handling is well understood in the art, but typically includes writing back some state corresponding to a "switched out" context (e.g., register state of a processor, current instruction pointer, stack pointer, etc.) to a backing store and loading from such a backing store (e.g., memory) at least some state corresponding to a "switched in" context. Of course, in some processor implementations, architectural techniques (including e.g., large onboard register sets with context-selectable subsets and simultaneous multithreading techniques) may facilitate lightweight context switches in which overheads associated with transfers to and from a backing store can be minimized. Depending on the implementation, VM 211 (particularly exposed vCPU 261) may leverage similar facilities including those supported by underlying hardware.

In any case, a switch 294 between execution contexts typically results in some observable change in architectural state of the processor (whether implemented as a hardware processor or, as in FIG. 2, as vCPU 261). For example, in a processor conforming to the Intel® IA-32 microprocessor architecture, states of certain registers, e.g., Control Register 3 (CR3, also known as the Page Directory Base Register, PDBR) and the Local Descriptor Table Register (LDTR) which contains the address in memory of the Local Descriptor Table (LDT), can be expected to change in correspondence with a context switch. As a result, contents of the CR3 register are often used in IA-32 architectures as a process id tracking mechanism. Of course, other instruction set architectures and implementations may provide other facilities for tracking context switches, and based on the description herein, persons of ordinary skill in the art will appreciate suitable adaptations. For example, some architectures expose an explicit address space identifier (sometimes called an ASID) which may be employed in a manner similar to that described above with respect to the CR3 register of IA-32 architectures. Similarly, a guest operating system may use its own identifier for a context, e.g., a process identifier (PID). Accordingly, in some embodiments in accordance with the present invention, a virtualization system may read such an identifier directly from guest kernel memory. A memory trace may be used to detect when the guest operating system modifies the identifier, as such a change may be made without modifying the architectural state of the processor.

Recognizing the variety of alternative mechanisms by which a processor and/or operating system may maintain context identifiers, embodiments of the present invention are described with generality. Accordingly, in the illustration of FIG. 2, VM 211 exposes register(s) 296 in, or via, which a context or process ID (PID) is encoded or may be referenced (e.g., using CR3, LDTR, ASID or PID states, etc.) for corresponding vCPUs. Note that, despite the use (here and elsewhere) of the shorthand "PID," nothing herein shall be construed as limiting embodiments to mechanisms for context identification that rely on guest operating system support.

In illustrated virtualization system 202, VMM 221 exposes resources of hardware machine 130 as virtual machine VM 211. For simplicity of illustration, only a single virtual machine is illustrated. In general, VMM 221 manages utilization of underlying hardware structures and states, typically through a combination of direct execution, selective binary translation, mapping and/or emulation techniques. When possible, it can be desirable to directly execute code that is scheduled for execution on a virtual machine (e.g., vCPU 261) on an underlying hardware processor (e.g., CPUs 131). However, for at least some instruction set architectures, binary translation or emulation of at least certain code and/or instructions may be necessary. Similarly, it can be desirable for memory accesses performed by code executing on the virtual machine to efficiently map to locations in underlying hardware memory (e.g., MEM 132) using memory management constructs such as page tables and translation lookaside buffers (TLBs) exposed to guest software as part of a virtual machine but maintained coherently with memory management facilities of underlying hardware.

Typically, both the internals of any direct execution and/or binary translation mechanism and the internals of any segmentation/memory management virtualization mechanisms will be hidden from guest computations. Accordingly, a virtualization barrier 292 is illustrated in FIG. 2 to mark a somewhat arbitrary boundary between exposed (and therefore visible) states, functionality and constructs of VM 211 and those states, functionality and constructs of VMM 221 (and underlying hardware 130) that are hidden from guest computations.

Of course, a number of significant practical challenges exist for virtualization system implementations that seek to directly execute code and coherently map underlying physical memory, particularly for virtualization of processors that implement the ubiquitous x86 or IA-32 instruction set architecture. In particular, practical implementations must typically deal with instruction sets that include instructions (sometimes called non-virtualizable instructions) that behave differently depending on an execution mode. Classic examples include instructions such as the IRET and PUSHF instructions implemented in x86 processors which behave differently based on a privilege level. Another set of practical challenges involves implementations of segmented architectures that include segment registers which are used to help manage and provide protection for a memory address space. In particular, semantics of certain IA-32-specific segment operations lead to reversibility challenges that are described and addressed in the art. While elegant solutions to these problems can be non-trivial, and virtualization system embodiments in accordance with the present invention may build upon such solutions, embodiments of the present invention relate more directly to selective alteration of virtual machine behavior for targeted execution contexts.

Therefore, certain aspects of virtualization system implementations are summarized and certain more detailed descriptions of specific implementations are incorporated herein by reference from: (a) U.S. Pat. No. 6,397,242 to Devine, Bugnion and Rosenblum describes methods for managing a mix of directly executable code and code for which binary translation may be performed; (b) U.S. Pat. No. 6,704,925 to Bugnion which, among other things, describes implementation of a dynamic binary translator mechanism and methods for maintaining coherence of a translation cache; (c) U.S. Pat. No. 6,785,886 to Lim, Le and Bugnion which, among other things, describes methods for shadowing segment descriptors in a VMM implementation and maintaining backmaps to address segment reversibility challenges; and (d) U.S. Pat. No. 7,222,221 to Agesen, Subrahmanyam and Adams which, among other things, describes methods for maintaining shadow page tables in a virtualization system and for maintaining coherence between related memory management data structures in a VM, a VMM and underlying hardware. U.S. Pat. Nos. 6,397,242, 6,704,925, 6,785,886 and 7,222,221 are therefore each incorporated herein by reference and persons of ordinary skill in the art will appreciate, based on the description herein, virtualization system implementations that build upon code execution/translation methods and/or segment/memory management virtualization methods described in detail in any of the incorporated patents.

Notwithstanding the foregoing, persons of ordinary skill in the art will readily understand embodiments of the present invention with reference to a more simplified view of VMM operations presented in FIG. 2. For example, in the illustration of FIG. 2, VMM 221 provides selective code execution facilities 293 (using any suitable mechanism including but not limited to those described in the above-incorporated patents). In general, selective code execution facilities 293 allow certain code to execute directly on underlying hardware in furtherance of the computation executing on exposed vCPU 261 while supporting at least some method (e.g., a binary translation method, hardware assisted virtualization or other trap and emulate methods, etc.) for executing alternative or modified instruction sequences when needed or when desirable. In general, hardware-assisted virtualization methods include those extensions to 32-bit and 64-bit x86 architecture commonly known as Intel VT (Intel® Virtualization Technology) and AMD-V™ (AMD Virtualization), which provide hardware support for trap and emulate methods whereby a VMM may specify those events that will cause the hardware to exit guest execution and trap into the VMM.

Apart from embodiments of the present invention, the availability of a binary translation for certain instructions or code blocks facilitates use of an efficient direct execution path for most code, while ensuring that non-virtualizable instructions or code blocks can be handled in a way that is faithful to the function/semantics of the original code. However, relative to embodiments of the present invention, selective code execution facilities 293 (whether supported using binary translation, hardware-assisted trap and emulate methods, or otherwise) can be adapted to provide a method for selectively altering the behavior of VM 211 for a targeted execution context. In particular, some embodiments employ facilities of a binary translation, emulation, or other facility to replace original code sequences (or individual instructions) that would ordinarily be executed in connection with current context 241 with code that is augmented to generate at least some side-effect 298 discernable by monitoring code 271, while still faithfully replicating the function/semantics of the original code.

Augmentation may simply introduce, e.g., responsive (see 297) to a registration (see 292), one or more extra instructions into a program sequence of code executed on behalf of context 241. For example, the introduced instruction(s) may increment a counter, set a flag in memory or in a register exposed by VM 211, execute a system call, etc. Alternatively, the introduced instruction(s) may be selected to trigger an exception or fault that may then be intercepted by the virtualization layer (monitoring code 271 of VMM 221) to increment a counter, set a flag or otherwise record transit of the current context 241 execution flow through registered code.

In a similar way, mapping, shadowing and tracing mechanisms 295 employed by VMM 221 to efficiently handle segmentation and memory management expose a VM-specific set of segment register states, TLB states and page table hierarchies, while mapping memory accesses and paging operations to underlying states and locations in memory 132. As with the selective code execution facilities 293 described above, mapping, shadowing and tracing mechanisms 295 are typically used to faithfully present virtual and physical address spaces consistent with the machine virtualized. However, in accordance with one or more embodiments of the present invention, such facilities can be employed to generate at least some side-effect 298 discernable by monitoring code 271, while still faithfully replicating the memory model of the exposed virtual machine.

For example, responsive (see 297) to a registration (see 299), page attributes or mapping information corresponding to registered code may be updated so that, upon an attempt to execute code on the corresponding page, an exception or fault is triggered. That exception or fault may then be intercepted by the virtualization layer (e.g., monitoring code 271 of VMM 221) to discern whether the faulting access indicates execution of the registered code and, if so, increment a counter, set a flag or otherwise record transit of the current context 241 execution flow through registered code. Similar techniques may be used in hardware assisted virtualization systems to detect, and respond to, an execution of registered code.

In each case, monitoring and selective alteration of VM behavior are performed from behind virtualization barrier 292 and may be hidden from both guest operating system 251 and the affected execution context (e.g., current context 241). Building on the foregoing illustration of a suitable virtualization system infrastructure, a few strategies for registering and monitoring code are described.

Registration

As described herein, a variety of programs or functions that may be executed within a guest context, such as anti-virus scanning, intrusion detection, firewall status, operating system integrity checks, etc., can benefit from virtualization system-level support for ensuring that specified operations thereof are actually being executed as intended. To identify the operations of interest, a registration facility can be provided as illustrated in FIG. 2. In general, some sort of identifying information or identifier is supplied to (299) or loaded by a code registration interface 272, where the identifying information or identifier can be used to identify registered code. Often the identifier will be associated with a trigger indication that may further specify the type, manner, timing, number of occurrences and/or frequency for events that are to be considered significant relative to the registered code.

Although registrations are maintained and acted upon by the virtualization system (e.g., in the VMM 221 implementation), in some embodiments, registration may be initiated from outside virtualization barrier 292. For example, in some embodiments, it may be desirable to allow a guest context to register itself for monitoring and/or execution assurance. In some embodiments, registrations may be provided through facilities of the virtualization system itself. Indeed, in some embodiments, registration via administrative facilities of the VMM implementation may constitute the exclusive registration mechanism. In some embodiments, VMM 221 may load registrations from virtual machine configuration information.

In general, any of a variety of methods may be used to identify or specify the extent of registered code. For example, a code region can be specified by address, by content, or by both address and content. For a user-mode guest program, a code region can be identified by a range of guest virtual addresses that contain the code region, or by one or more guest virtual addresses within that range. For a kernel-mode guest program, such as a driver, a code region could also be identified by a range of guest physical addresses that contain the code region. Alternatively, a code region could be identified by its contents, such as based on an actual sequence of bytes containing executable instructions. Similarly, content-based identification could be performed by specifying a more compact hash, checksum, or signature of the actual contents (e.g., a secure MD5 hash). For example, one content-based code identification technique that could be employed for content based registration is described in greater detail in commonly-owned, co-pending application Ser. No. 10/791,602, filed Mar. 2, 2004, entitled "DYNAMIC VERIFICATION OF VALIDITY OF EXECUTABLE CODE" and naming as inventors, Waldspurger, Agesen, Chen, Zedlewski, and Garfinkel, which is incorporated herein by reference.

Registrations may specify triggers for use by the monitoring system and/or, in some embodiments, for enforced execution. For example, in some embodiments, an execution trigger can be specified as an event type and an associated count. In this way, monitoring system 271 may determine whether the registered code has been executed at least after the specified number of matching events. Similarly, in an enforced execution system such as described later herein, monitoring system 271 may determine the specified number of matching events have been observed and it is time to force execution of registered code into execution context 241. Note that a count may be one, so that the trigger fires on every matching event. In addition, in some embodiments and/or for some types of events, a count may be omitted or implied. In some embodiments, it may be desirable to specify compound execution triggers that are composed of several individual triggers, e.g., as Boolean expressions involving predicates over multiple events.

Building the registration framework described above, a simple time-based trigger may be specified using the same type of parameters that are commonly used to specify periodic callbacks in computer systems, such as a period expressed in units of milliseconds or timer ticks. For example, a registration may specify that monitoring system 271 checks to ensure that program code implementing a system integrity scan is executed at least once in any 5 second interval.

Another registration may identify real-time virus scanning code that is to be executed within a short, but specified, period of time, after reading a file or stream. As yet another example, a registration may specify that code which scans for suspicious branch targets should be executed at least once for every N write accesses to a range of memory addresses that includes a return address stack.

A registration that identifies a code region (e.g., by virtual/physical address range or content) and its expected execution trigger (e.g., a period in units of time or other events) is communicated (299) to the virtualization layer. In some embodiments, an executing guest program 291 may itself communicate with the registration facilities 272 of VMM 221 using a predefined "hypercall" interface (as in para-virtualized systems, such as VMI), or similarly, using some predefined communication channel, such as a special I/O port provided in virtualization systems available from VMware, Inc. In some embodiments, one or more registrations may be specified without involvement of the guest computation (e.g., without involvement of guest OS 251 or any execution context thereof) from outside of the virtual machine. For example, registrations may be specified as static or dynamic configuration information maintained by the virtualization system for VM 211.

In some cases, an administrator may specify that code with a particular content hash should be executed with a specified periodicity. As before, such a registration may be used to support monitoring of guest contexts for execution of specified code in accord with the registration and/or, in some embodiments, as a directive for forced execution of registered code, irrespective of guest context execution. Supporting and/or performing the registration outside of the VM is typically more secure, since registration facilities or flows that are not exposed outside virtualization barrier 292 should not typically be vulnerable to interdiction by software running within the guest OS, which might have been compromised.

Guest Code Monitoring

Figure 3:
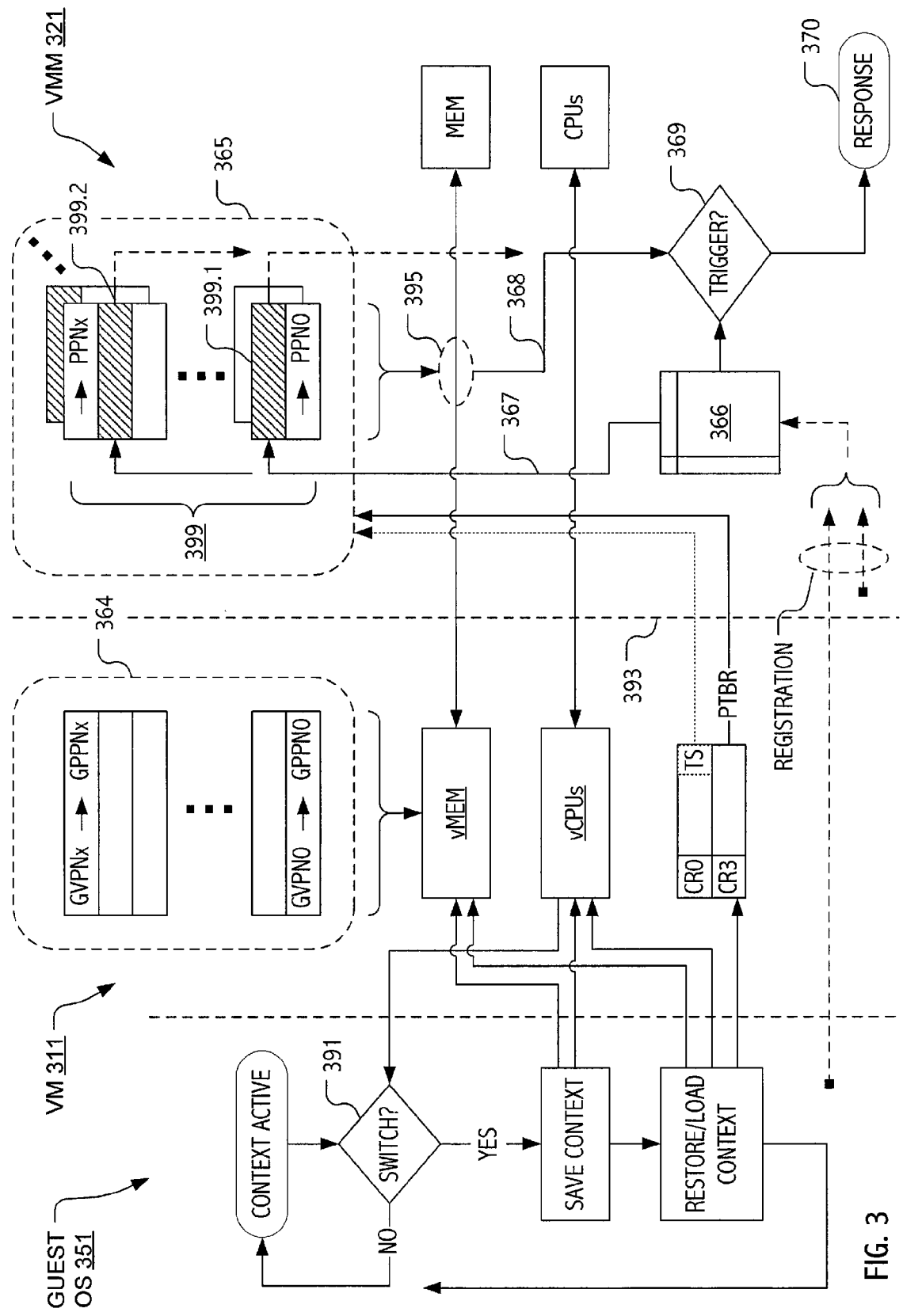
FIG. 3 is used to illustrate exemplary scenarios in which selective alterations to the memory mapping and/or management facilities of a virtualization system are employed to facilitate monitoring of registered code.

Relative to the monitoring of guest contexts for execution of registered code, FIG. 3 illustrates an example scenario in which a guest computation (e.g., guest operating system 351 and various contexts thereof) execute on VM 311. VM 311 includes resources exposed from underlying hardware resources by VMM 321. For example, guest operating system 351 maintains in exposed memory vMEM, address translations 364 that map virtual memory pages (e.g., guest virtual pages GVPN0 . . . GVPNx) to what it perceives to be physical pages (e.g., guest physical pages GPPN0 . . . GPPNx). In general, virtual-to-physical mappings are conventional except that, as described below, additional mappings (maintained by the virtualization system) are used to resolve addresses to actual physical pages.

Based on a context switch 391, which may be triggered in any of the usual ways (e.g., based on operating system scheduling, control flow in the current context, a page fault, interrupt, etc.) relevant states of a current context (e.g., registers, call stack, etc.) are saved and those of another context are restored. In the course of the context switch, address translations 364 and contents of control registers exposed to VM 311 are updated in accord with operative conventions of guest operating system 351 and of the particular processor architecture virtualized by exposed processor(s) vCPUs.

For example, in some virtualizations of an IA-32-type processor architecture, an architecturally-defined control register such as the CR0 register will contain a task switch flag and a CR3 register will identify the location of a page directory that is associated with the new context. Therefore, by monitoring the state of these exposed, architecturally-defined features, VMM 321 may observe a context switch and make any appropriate changes to its state and its presentation of virtualized resources (e.g., memory vMEM and processor(s) vCPUs) from underlying hardware resources (e.g., physical memory MEM and hardware processor(s) CPUs).

In general, to expose memory vMEM to guest operating system 351 (which generally knows nothing of physical memory underlying the virtualization, its mappings or paging state), virtualization system VMM 321 maintains a further set of mappings 365 from guest address space to pages in physical memory managed by the virtualization system. In some cases, these mappings provide the information that allows VMM 321 to map from a guest physical page to a physical page represented in memory of the underlying hardware. In hardware assisted virtualization systems, such mappings from a guest address space to pages in physical memory may be specified by virtualization software, but may be used by the underlying processor(s), such as in the case of the Extended Page Tables (EPT) of the Intel VT technology. In some cases, VMM 321 employs isolation techniques, including shadow page tables, such as described in greater detail in commonly-owned, co-pending application Ser. No. 11/584,178, filed Oct. 20, 2006, entitled "ISOLATING DATA WITHIN A COMPUTER SYSTEM USING PRIVATE SHADOW MAPPINGS" and naming as inventors, Chen, Waldspurger, and Subrahmanyam, which is incorporated herein by reference. In any case, an operative set (or subset) of mappings is selected by VMM 321 based on a then current execution context.

Memory Mapping Techniques

Based on the preceding description, it will be understood that, in some embodiments, registered code may be specified or identified by one or more memory addresses. For example, a code region of a user-mode guest program can be identified by a range of guest virtual addresses. Similarly, a code region of a kernel-mode guest program, such as a driver, can be identified by a range of guest physical addresses. Data structures characteristically accessed by registered code may be similarly identified by a memory address. Accordingly, registrations (e.g., those appearing in registration store 366) allow VMM 321 to identify corresponding entries in page tables, translation lookaside buffers, etc. (shown collectively as a current operative set 399 of mappings 365) for which memory management attributes may be manipulated to facilitate monitoring of events related to execution of registered code, access to sensitive data structures, etc.

In one embodiment, page table entries (e.g., the current operative set 399 of mappings maintained by VMM 321) that map guest virtual pages to actual physical pages (i.e., GVPN→PPN mappings) are updated (367) based on registrations appearing in registration store 366 to mark entries that correspond to registered code with page attributes that facilitate monitoring. For example, by marking (367) such pages as "not executable" or "not present," VMM 321 leverages memory management facilities that exist behind virtualization barrier 393 to provide an efficient monitoring mechanism that may be entirely invisible to code running within guest operating system 351. For registered code that runs in user mode, the "system" flag may be used for monitoring execution. More particularly, when VMM 321 executes registered code on behalf of a guest execution context, memory mappings 395 using the corresponding entry (e.g., page table entry 399.1) of current operative set 399 generate a "hidden" fault 368 that is intercepted within VMM 321 and is not visible to guest execution contexts. Based on the hidden fault 368, VMM 321 can record when the registered code is actually executed and evaluate (369) as against the registered trigger. As indicated above, such faults can, in general, be supplied based on attempts to execute code on a marked page or based on attempts to access data on a marked page. Both mechanisms may be employed in some embodiments. Again, similar techniques may be used in hardware assisted virtualization systems, such as by using bits in extended or nested page tables to indicate that an address is "not executable" or "not present."

For example, consider a registration of system integrity scan code that specifies execution at least once in any 5 second interval. If VMM 321 handles, before expiry of an appropriate timer, a fault generated by an attempt to execute code at the address registered for the integrity scan code, then the desired execution is confirmed and the timer is reset. Otherwise, on expiry, an appropriate response (370) may be triggered. In general, appropriate responses may include generating a notification or alert; informing a software module, user, or administrator that registered code has not been executed as desired; and/or, in some embodiments, forcing execution of the registered code into a guest execution context.

Similarly, in the case of a registration that specifies certain virus scanning code that is to be executed within a short, but specified, period of time after reading a file or stream, a related strategy may be employed. For example, upon a system call that can be associated with reading the file or stream of interest, a timer may be initialized and if, prior to expiry of the timer, VMM 321 handles a fault generated by an attempt to execute code at the address registered for the virus scanning code, then the desired execution is confirmed. Otherwise, on expiry, an appropriate response (370) may be triggered. Note that timer initialization may itself be triggered by a similar mechanism tied to execution of a system call at a known address. Alternatively, binary translation (BT) techniques (such as described elsewhere herein) may be employed to augment code actually executed by VMM 321 in furtherance of the system call so as to initialize the timer.

Likewise, a registration that specifies that certain code which scans for suspicious branch targets should be executed at least once for every N write accesses to a return address stack may be handled using similar techniques. For example, by marking as "read-only" a mapping (e.g., page table entry 399.2) which corresponds to the in-memory extent of the return address stack, VMM 321 may intercept faults corresponding to attempted write accesses, increment a corresponding counter and thereafter allow the write access to proceed. Upon an Nth interception of the fault, VMM 321 may check whether the appropriate scan has been performed (again using a memory management mediated monitoring mechanism), or may optionally force execution of the scan for suspicious branch targets into the current context as described elsewhere herein.

Code Modification Techniques

In some virtualization system implementations and/or for some code registrations or trigger events, it may be desirable to employ techniques (such as binary translation or emulation) that allow code executed on behalf of a guest computation to be augmented when instruction sequences are actually executed on underlying hardware. For many of the code registrations or trigger events described herein in the context of monitored code examples, either or both of memory mapping techniques and code modification techniques may be employed. In some cases, memory mapping may provide a low-overhead mechanism with great specificity of detection. In some cases, runtime augmentation of specific code may provide an attractive mechanism for monitoring specific code or for sampling a relevant event. In any case, selection of an appropriate mechanism to support any given monitoring goal is typically a matter of design choice. One monitoring mechanism may be selected over another mechanism for sole use in a virtualization system implementation based on general monitoring goals, or multiple monitoring mechanisms may be used within a single implementation in an attempt to improve efficiency, effectiveness, or based on other criteria. Different mechanisms may be used for different code registrations and/or different mechanisms may be used for a single code registration at different times, based on any one or more of various operational parameters or conditions.

Figure 4:
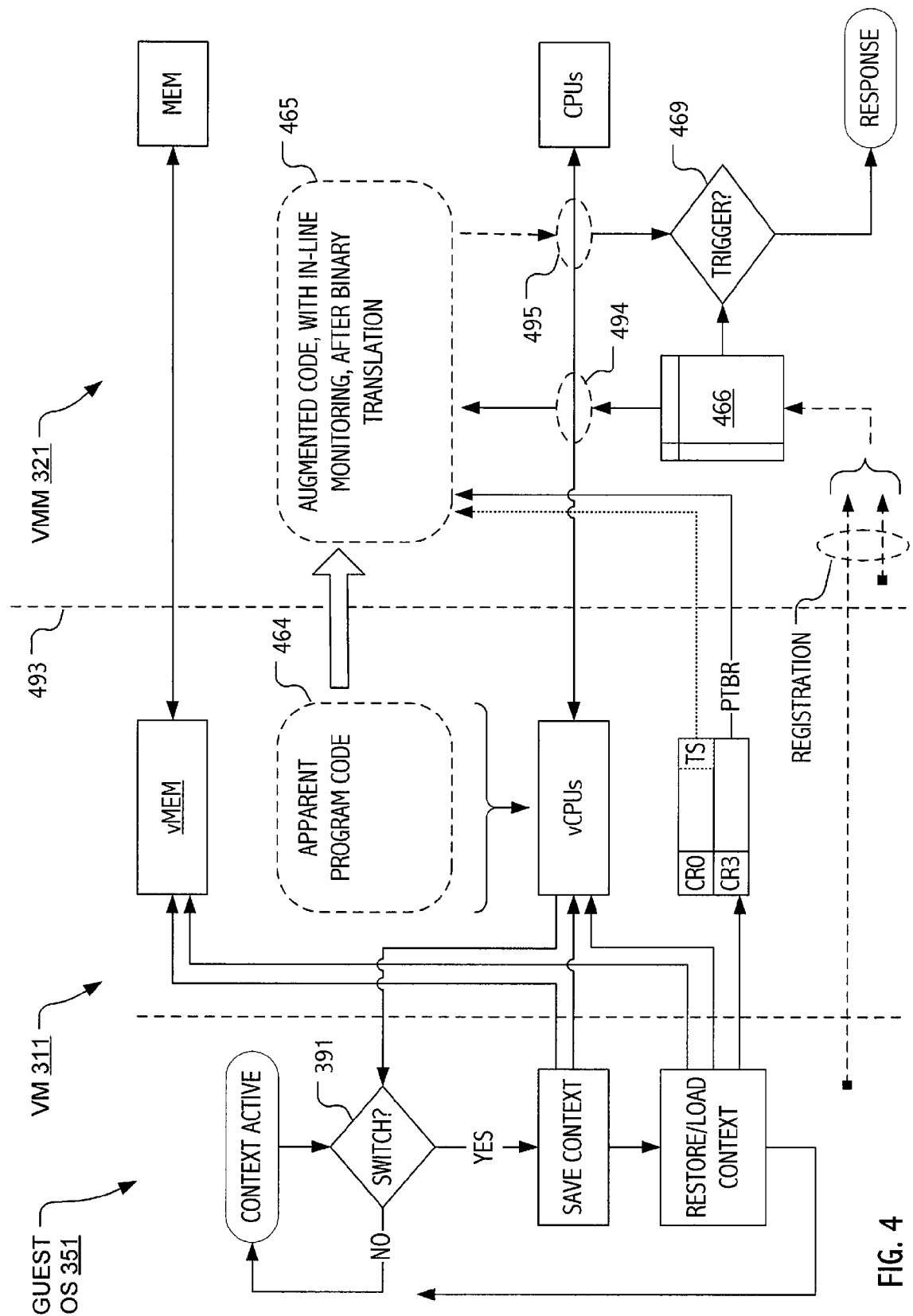
FIG. 4 is used to illustrate exemplary scenarios in which selective alterations to the execution characteristics of a virtualization system are employed to facilitate monitoring of registered code.

Accordingly, FIG. 4 illustrates exemplary scenarios in which selective alterations to the execution characteristics of a virtualization system are employed to facilitate monitoring of registered code. The illustrations of runtime augmentation to guest code are in many ways analogous to situations described with reference to FIG. 3 and will be understood with reference to the description of FIG. 3. In addition, in view of the prior description, aspects of memory mapping are de-emphasized for clarity in FIG. 4. Nonetheless, based on the description herein, persons of ordinary skill in the art will appreciate that, at least in some embodiments, virtualization system implementations may employ both sets of techniques.

Referring now to FIG. 4, VMM 321 modifies code or control flows of an execution context which, based on a registration appearing in registration store 466, corresponds to registered code or to an event to be monitored with reference to registered code. In general, VMM 321 may overwrite, patch, or otherwise modify binary code (494) that would normally be executed for the current context. For example, existing instruction sequences can be augmented or altered (465) to generate a side effect that is observable. One example of such an augmentation or alteration is substitution of a particular (presumably valid) instruction of registered code with a coding that corresponds to an illegal instruction and thus triggers a "hidden" fault 495 that is intercepted within VMM 321 and is not visible to guest execution contexts. Alternatively, a memory access instruction can be purposefully altered to target a memory address that will trigger a paging, or memory management or protection fault (again hidden from guest execution contexts) that may be intercepted and serviced by VMM 321.

If the substituted instruction corresponds to registered code, VMM 321 can record when the registered code (based on the intercepted fault) is actually executed and evaluate (469) against a corresponding trigger. Alternatively, if the substituted instruction corresponds to an event trigger, VMM 321 can log the event, initiate an appropriate timer, etc. In either case, after servicing the fault, VMM 321 may restore original execution semantics and continue executing instructions on behalf of the current guest execution context.

In general, any augmentation or alteration that provides VMM 321 with a discernible side-effect may be employed. For example, although fault based techniques have been emphasized above, other more direct transfers of control may be exploited. In some implementations, VMM 321 may dynamically alter a branch target for target code based on a registration appearing in registration store 466 so as to interpose the desired monitoring or event detection sequence. In some cases, VMM 321 may even directly "warp" the program counter associated with a guest context, causing a transfer of control to code that provides the discernible side-effect.

Virtualization System Technology and Variations

Based on the foregoing, persons of ordinary skill in the art will appreciate a variety of strategies by which a virtualization system can monitor and selectively alter virtual machine behavior for registered code. Typically, the selective alterations are performed from behind a virtualization barrier and may be hidden from both the guest operating system and the affected execution context. In general, the described embodiments may be exploited in a variety of virtualization system designs including those now reviewed.

As is well known in the art, a virtual machine (VM) is a software abstraction—a "virtualization"—of an actual physical computer system. FIGS. 1-4 illustrate aspects of embodiments of the present invention for monitoring registered code. In describing embodiments of the present invention, certain aspects of more complete virtualization system implementations have been abstracted. To facilitate an understanding of the broad applicability of embodiments of the present invention, a few examples of specific virtualization system designs and variations thereon are described.

In general, in most virtualization system designs, some interface is provided between guest software within a VM and the various hardware components and devices in the underlying hardware platform. This interface—which can generally be termed "virtualization software"—may include one or more software components and/or layers, possibly including one or more of the software components known in the field of virtual machine technology as "virtual machine monitors" (VMMs), "hypervisors," or virtualization "kernels." Because virtualization terminology has evolved over time and has not yet become fully standardized, these terms (when used in the art) do not always provide clear distinctions between the software layers and components to which they refer. For example, the term "hypervisor" is often used to describe both a VMM and a kernel together, either as separate but cooperating components or with one or more VMMs incorporated wholly or partially into the kernel itself; however, the term "hypervisor" is sometimes used instead to mean some variant of a VMM alone, which interfaces with some other software layer(s) or component(s) to support the virtualization. Moreover, in some systems, some virtualization code is included in at least one "superior" VM to facilitate the operations of other VMs. Furthermore, specific software support for VMs is sometimes included in the host OS itself. Unless otherwise indicated, embodiments of the present invention may be used (and/or implemented) in (or in conjunction with) virtualized computer systems having any type or configuration of virtualization software.

In view of the above, and without limitation, an interface usually exists between a VM and the underlying platform which is responsible for actually executing VM-issued instructions and transferring data to and from the memory and storage devices or underlying hardware. Subject to the foregoing, certain commercially available virtualization systems employ a "virtual machine monitor" (VMM) in this role. A VMM is usually implemented as a thin piece of software that runs directly on top of a host, or directly on the hardware, and virtualizes at least some of the resources of the physical host machine. The interface exported to the VM is then the same as the hardware interface of a physical machine. In some cases, the interface largely corresponds to the architecture, resources and device complements of the underlying physical hardware; however, in other cases it need not.

Although the VM (and thus applications executing in the VM and their users) cannot usually detect the presence of the VMM, the VMM and the VM may be viewed as together forming a single virtual computer. They are shown and described herein as separate components for the sake of clarity and to emphasize the virtual machine abstraction achieved. However, the boundary between VM and VMM is somewhat arbitrary. For example, while various virtualized hardware components such as virtual CPU(s), virtual memory, virtual disks, and virtual device(s) including virtual I/O devices can be presented as part of previously described VMs (see FIGS. 1-4), in some virtualization system implementations, these "components" are at least partially implemented as constructs or emulations exposed to a VM by the VMM. One advantage of such an arrangement is that the VMM may be set up to expose "generic" devices, which facilitate VM migration and hardware platform-independence. In general, such functionality may be said to exist in the VM or the VMM.

Figure 5:
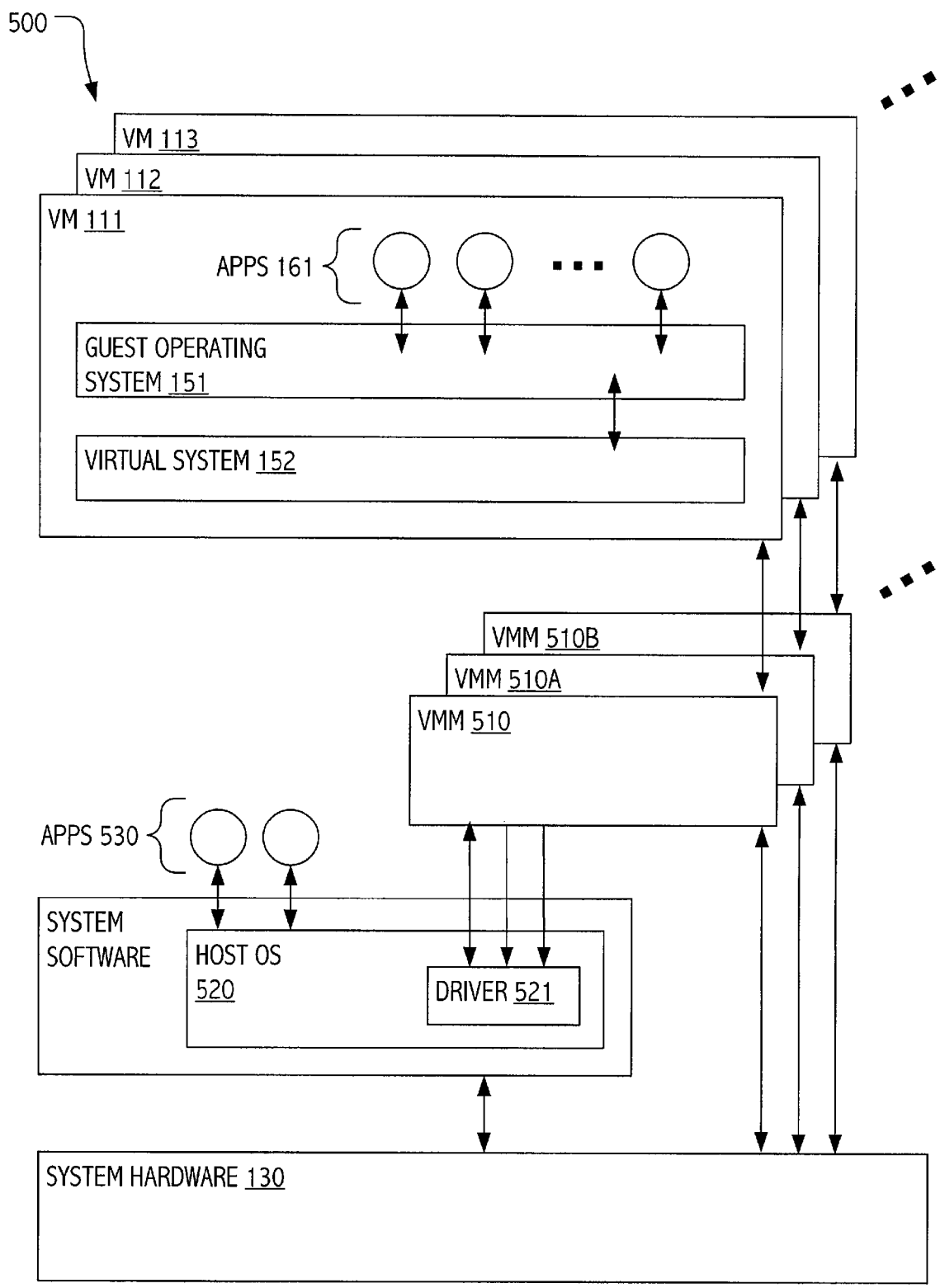
FIGS. 5 and 6 depict functional block diagrams of virtualization system configurations in accordance with respective embodiments of the present invention.
Figure 6:
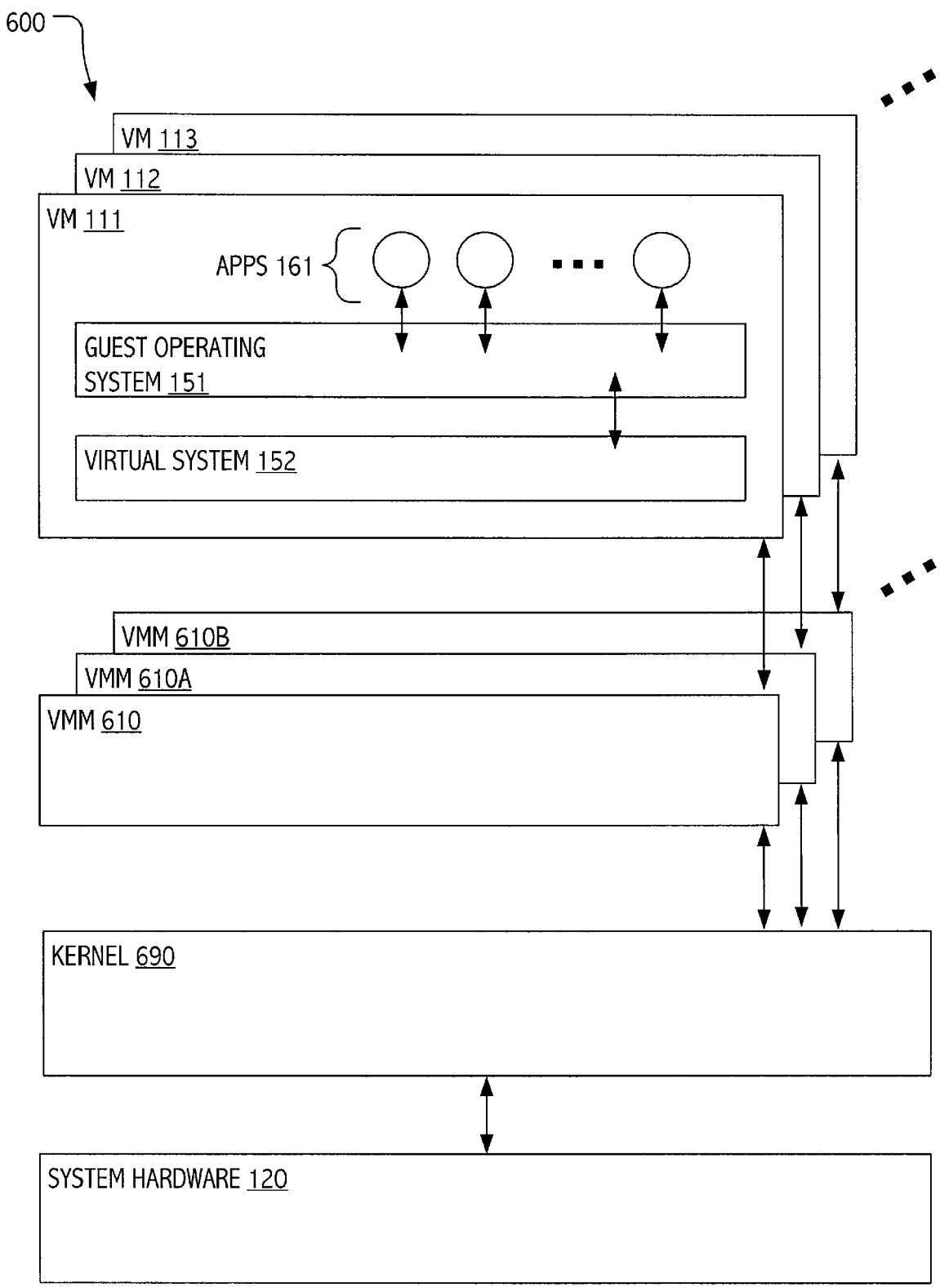

It should be noted that while VMMs can be viewed as executing on underlying system hardware, many implementations based on the basic abstraction may be implemented. In particular, some implementations of VMMs (and associated virtual machines) execute in coordination with a kernel that itself executes on underlying system hardware, while other implementations are hosted by an operating system executing on the underlying system hardware and VMMs (and associated virtual machines) execute in coordination with the host operating system. Such configurations, sometimes described as "hosted" and "non-hosted" configurations, are illustrated in FIGS. 5 and 6. In the hosted configuration, an existing, general-purpose operating system (OS) acts as a "host" operating system that is used to perform certain I/O operations. In the "non-hosted" configuration, a kernel customized to support virtual computers takes the place of the conventional operating system.

Embodiments of the present invention for monitoring registered code may build on systems of either configuration. Accordingly, in view of the variations, two exemplary virtualization system configurations are summarized and, based on the preceding description, persons of ordinary skill in the art will appreciate suitable hosted and non-hosted embodiments of the present invention.

Hosted Virtual Computers

FIG. 5 illustrates a virtualization system configuration 500 commonly referred to as a "hosted" virtualized computer system in which a virtual machine monitor (e.g., VMM 510, VMM 510A, VMM 510B) is co-resident at system level with the host operating system 520 such that both the VMMs and the host operating system can independently modify the state of the host processor. VMMs call into the host operating system via driver 521 and a dedicated one of the user-level applications 530 to have the host OS perform certain I/O operations on behalf of the VM. The virtual computer in this configuration is thus hosted in that it runs in coordination with an existing host operating system. Virtualization systems that include suitable facilities are available in the marketplace. For example, VMware® Server virtualization software available from VMware, Inc., Palo Alto, Calif. implements a hosted virtualization system configuration consistent with the illustration of FIG. 5. VMware® Workstation desktop virtualization software, also available from VMware, Inc., also implements a hosted virtualization system configuration consistent with the illustration of FIG. 5.

Non-Hosted Virtual Computers

FIG. 6 illustrates a virtualization system configuration commonly referred to as a "non-hosted" virtualized computer system in which a dedicated kernel 690 takes the place of and performs the conventional functions of a host operating system. Virtual computers (e.g., VM/VMM pairs) run on the kernel. Compared with a system in which VMMs run directly on the hardware platform, use of a kernel offers improved performance because it can be co-developed with the VMMs and optimized for the characteristics of a workload consisting of VMMs rather than a more general collection of tasks. Moreover, a kernel can also be optimized for I/O operations and it can facilitate provision of services that extend across multiple VMs (for example, for resource management). Virtualization systems that include suitable kernels are available in the marketplace. For example, VMware ESX™ virtualization software available from VMware, Inc., Palo Alto, Calif. implements a non-hosted virtualization system configuration consistent with the illustration of FIG. 6. ESX is a trademark of VMware, Inc.

Different systems may implement virtualization to different degrees-"virtualization" generally relates to a spectrum of definitions rather than to a bright line, and often reflects a design choice in respect to a trade-off between speed and efficiency on the one hand and isolation and universality on the other hand. For example, "full virtualization" is sometimes used to denote a system in which no software components of any form are included in the guest other than those that would be found in a non-virtualized computer; thus, the guest OS could be an off-the-shelf, commercially available OS with no components included specifically to support use in a virtualized environment.

In contrast, another term which has yet to achieve a universally accepted definition is that of "para-virtualization." As the name implies, a "para-virtualized" system is not "fully" virtualized, but rather the guest is configured in some way to provide certain features that facilitate virtualization. For example, the guest in some para-virtualized systems is designed to avoid hard-to-virtualize operations and configurations, such as by avoiding certain privileged instructions, certain memory address ranges, etc. As another example, many para-virtualized systems include an interface within the guest that enables explicit calls to other components of the virtualization software. For some, the term para-virtualization implies that the guest OS (in particular, its kernel) is specifically designed to support such an interface. According to this view, having, for example, an off-the-shelf version of Microsoft Windows XP as the guest OS would not be consistent with the notion of para-virtualization. Others define the term para-virtualization more broadly to include any guest OS with any code that is specifically intended to provide information directly to the other virtualization software. According to this view, loading a module such as a driver designed to communicate with other virtualization components renders the system para-virtualized, even if the guest OS as such is an off-the-shelf, commercially available OS not specifically designed to support a virtualized computer system.

Unless otherwise indicated or apparent, virtualized computer system-based realizations of the present invention are not restricted to use in systems with any particular "degree" of virtualization and is not to be limited to any particular notion of full or partial ("para-") virtualization. Furthermore, embodiments of techniques described herein for impeding or interdicting system calls can also be applied to "hypercalls" between a guest and a VMM or hypervisor. In general, hypercall mechanisms are part of a well-defined interface for transitioning between the guest and the VMM/hypervisor, while system call mechanisms are part of a well-defined interface for transitioning between user-mode and kernel-mode. Accordingly, based on the description herein, persons of ordinary skill in the art will appreciate analogous, hypercall-targeted adaptations of the aforementioned techniques for impeding or interdicting system calls.

OTHER EMBODIMENTS

While the invention(s) is (are) described with reference to various implementations and embodiments, it will be understood that these embodiments are illustrative and that the scope of the invention(s) is not limited to them. In general, virtual machines may be implemented consistent with hardware systems now existing or hereafter defined. In addition, while our description of virtualization techniques has generally assumed that the virtual machines present interfaces consistent with a hardware system, persons of ordinary skill in the art will recognize that the techniques described may be used in conjunction with virtualizations that do not correspond directly to any particular hardware system. Virtualization systems in accordance with the present invention, implemented as hosted embodiments, non-hosted embodiments or as embodiments that tend to blur distinctions between the two, are all envisioned.

Although achieving a goal of VMM transparency may be facilitated using techniques of the present invention, VMM transparency is not required. Rather, the virtualization system techniques for monitoring registered code may be incorporated in so-called "para-virtualization" systems in which a guest operating system is aware that it is being virtualized, and has an explicit interface to the VMM. In such systems, functionality analogous to that described herein as a VMM is sometimes referred to as a "hypervisor."

Many variations, modifications, additions, and improvements are possible. For example, while strategies for monitoring registered code have been described in detail herein, other techniques and strategies will also be appreciated by persons of ordinary skill in the art based on the description herein. Furthermore, while techniques and mechanisms have been described using particular network configurations, hardware architectures, memory organizations and particular operating system constructs (typically IA-32 based architectures/systems and Windows or Linux-based operating systems) as a descriptive framework, persons of ordinary skill in the art will recognize that it is straightforward to modify such implementations for use in systems that support other processor instruction set architectures, other network or memory configurations and/or other operating system constructs. Furthermore, although certain embodiments of the present invention are illustrated herein in a descriptive context that includes software distributed conventionally (and often in multiple separately packaged components) as operating system and/or application software that are together executable as a guest computation, other guest software models are also possible. For example, guest software instances may be implemented as "so-called" virtual appliances in the form of pre-built, pre-configured, ready-to-run applications typically packaged with an operating system inside a virtual machine as a self-contained, self-consistent, software solution.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the invention(s).

What is claimed is:

1. A method of operating a virtualization system, the method comprising:
   executing a guest operating system in a virtual machine of the virtualization system;
   identifying, by a processor executing the virtualization system, code registered for execution in connection with a guest computation;
   determining whether at least one execution context of the guest computation in which execution of the registered code is expected is executed as expected in response to a triggering event; and
   hiding an execution of the registered code from the guest computation.

2. The method of claim 1, wherein the triggering event is a defined period of time.

3. The method of claim 1, wherein the triggering event is defined time intervals.

4. The method of claim 1, further comprising:
   updating memory mapping information maintained by the virtualization system for a portion of memory that contains at least a portion of the registered code; and
   triggering, based on the updated memory mapping information, execution of code that indicates an execution of the registered code.

5. The method of claim 4, wherein the updated mapping information includes a page table mapping that maps from a guest virtual page (GVPN) exposed to the virtual machine to a physical page (PPN) in memory addressable by the virtualization system.

6. The method of claim 4, wherein the updating includes marking a memory page as not executable or not present; and
   wherein the triggered code includes a fault handler.

7. The method of claim 1, further comprising augmenting binary code instruction sequences executed by the virtualization system in connection with the registered code to indicate an execution of registered code.

8. The method of claim 7, wherein the augmenting is performed using binary translation functionality of the virtualization system.

9. The method of claim 1, further comprising registering the code and an associated trigger.

10. The method of claim 9, wherein registration of the code is performed in response to a request from within the virtual machine.

11. The method of claim 9, wherein the registered code is identified in connection with static or dynamic configuration information for the virtual machine.

12. The method of claim 1, wherein the registered code is identified using one or more of:
   an address at which at least a portion of the registered code is stored in virtual or physical memory space;
   a process, threat, or task identifier under which the registered code is scheduled for execution by the guest operating system;
   an associated execution context of the guest operating system; and
   content of at least a portion of the registered code.

13. The method of claim 1, further comprising triggering a notice, alert, or policy-based responsive action in response to a failure to execute the registered code as expected.

14. The method of claim 1, further comprising forcing, from the virtualization system, execution of the registered code.

15. The method of claim 14, wherein the forcing is in response to a failure to execute the registered code as expected.

16. The method of claim 1, wherein execution of the registered code and unregistered code are coordinated by the guest operating system.

17. The method of claim 1, wherein the guest operating system includes a software appliance; and
   wherein the registered code constitutes a portion of the software appliance.

18. The method of claim 1, wherein the registered code includes code associated with operating one or more of:
   an antivirus system;
   a firewall or gateway;
   an intrusion detection system;
   a performance or uptime monitoring system;
   a license monitoring, metering or enforcement system;
   a copyright or digital rights management system; and
   critical operating system functionality.

19. A computational system that, when executed by a processor, performs the steps of:
   identifying registered code within a virtual machine; and
   determining whether at least one execution context of a guest computation in which execution of the registered code executes is expected is executed as expected in response to a triggering event,
   wherein the identifying and the determining are performed from behind a virtualization barrier and without reliance on functionality of guest software executing within the virtual machine.

20. The computational system of claim 19, wherein a guest operating system is instantiated in the virtual machine as the guest software, and wherein execution of the registered code and unregistered code are coordinated by the guest operating system.

21. The computational system of claim 19, wherein execution of the computational system by a processor further performs the steps of:
   coordinating, by a virtualization system, execution on an underlying hardware machine of instruction sequences that correspond to respective execution contexts of the guest software; and
   augmenting at least a particular one of the instruction sequences executed by the virtualization system in connection with the registered code to record execution of registered code.

22. The computation system of claim 19,
   wherein execution of the computational system by a processor further performs the steps of:
   maintaining, by a virtualization system, mapping information for memory pages exposed to the guest software, the mapping being from a guest memory space to a physical memory space addressable by the virtualization system;
   updating memory mapping information for a portion of memory that contains at least a portion of the registered code; and
   triggering, based on the updated memory mapping information, execution of code that indicates an execution of the registered code.

23. An apparatus comprising:
   a hardware machine; and
   a processor programmed to:
   access virtualization software;
   execute the virtualization software to expose at least one virtual machine using resources of the hardware machine;
   access guest software;
   execute the guest software on an exposed virtual machine, wherein the virtualization software includes code executable on the hardware machine to monitor for execution of registered code within the exposed virtual machine, wherein the monitoring is performed from behind a virtualization barrier and without reliance on functionality of the guest software;

determine whether the registered code is executed as expected in response to a triggering event; and hide an execution of the registered code from the guest software.

24. A non-transitory computer-readable medium storing computer-executable instructions for:

identifying registered code within a virtual machine; and determining whether at least one execution context of a guest computation in which execution of the registered code is expected is executed as expected in response to a triggering event, wherein the identifying and the determining are performed from behind a virtualization barrier and without reliance on functionality of guest software executing within the virtual machine.

25. The non-transitory computer-readable medium of claim 24, further comprising instructions for:

altering an instruction sequence of the registered code and thereby monitor its execution.

26. The non-transitory computer-readable medium of claim 24, further comprising instructions for:

modifying page table entries that correspond to the registered code and which are maintained by the virtualization system; and triggering, upon attempted access to the registered code, an indication of registered code execution.

* * * * *